United States Patent
Marupaduga et al.

(10) Patent No.: US 11,290,139 B1
(45) Date of Patent: *Mar. 29, 2022

(54) METHOD AND SYSTEM FOR CONTROLLING INTERFERENCE BY DYNAMICALLY ADJUSTING QUANTITY OF ANTENNAS

(71) Applicant: Sprint Spectrum L.P., Overland Park, KS (US)

(72) Inventors: Sreekar Marupaduga, Overland Park, KS (US); Rajveen Narendran, Olathe, KS (US); Vanil Parihar, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,407

(22) Filed: Dec. 10, 2020

Related U.S. Application Data

(63) Continuation of application No. 16/535,581, filed on Aug. 8, 2019, now Pat. No. 10,917,125.

(51) Int. Cl.
| | |
|---|---|
| *H04B 1/04* | (2006.01) |
| *H04B 7/0413* | (2017.01) |
| *H04B 17/345* | (2015.01) |
| *H04W 88/08* | (2009.01) |

(52) U.S. Cl.
CPC ......... *H04B 1/0475* (2013.01); *H04B 7/0413* (2013.01); *H04B 17/345* (2015.01); *H04W 88/08* (2013.01)

(58) Field of Classification Search
CPC .. H04B 7/0413; H04B 17/345; H04B 1/0475; H04B 7/04; H04B 7/06; H04B 7/0452
See application file for complete search history.

(56) References Cited

U.S. PATENT DOCUMENTS

| | | | |
|---|---|---|---|
| 10,917,125 B1* | 2/2021 | Marupaduga | H04B 7/0413 |
| 2011/0294435 A1 | 12/2011 | Miller et al. | |
| 2011/0312353 A1 | 12/2011 | Banister et al. | |
| 2013/0121265 A1 | 5/2013 | Awoniyi et al. | |
| 2015/0030091 A1 | 1/2015 | El-Najjar et al. | |
| 2017/0201892 A1* | 7/2017 | Wen | H04B 7/063 |
| 2019/0341985 A1 | 11/2019 | Chopra et al. | |

* cited by examiner

*Primary Examiner* — Keith Ferguson

(57) ABSTRACT

A mechanism to control transmission by a base station, which may help to control interference on an adjacent frequency. The base station is configured to operate on a first frequency and is equipped with a number of antennas enabled for transmission on the first frequency. Upon detecting of a trigger for reducing potential interference on the adjacent frequency, the base station reduces the number of its antennas that are enabled for transmission on the first carrier, which may reduce the overall energy of the base station's transmission and may thereby reduce interference on the adjacent frequency. In an example implementation, the base station could disable a proper subset of its antennas from use for transmission on the first frequency, while leaving a remainder of its antennas enabled for transmission on the first frequency.

20 Claims, 6 Drawing Sheets

---

DETECT A TRIGGER FOR REDUCING A POTENTIAL FOR INTERFERENCE ON AN ADJACENT, SECOND FREQUENCY — 70

RESPONSIVE TO AT LEAST THE TRIGGER, DYNAMICALLY REDUCE QUANTITY OF A BASE STATION'S ANTENNAS ENABLED FOR TRANSMISSION ON A FIRST FREQUENCY — 72

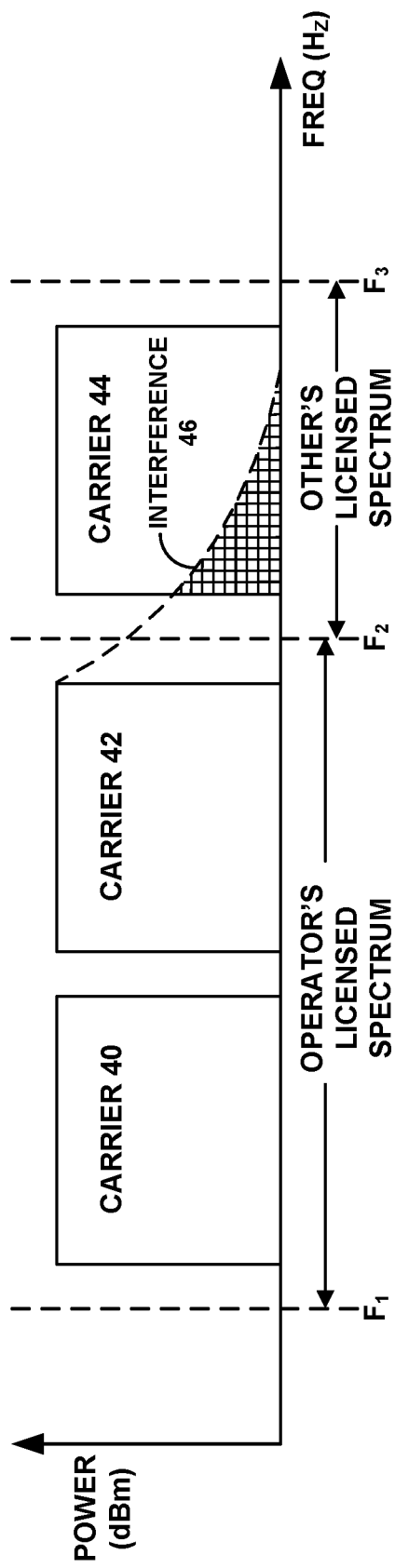
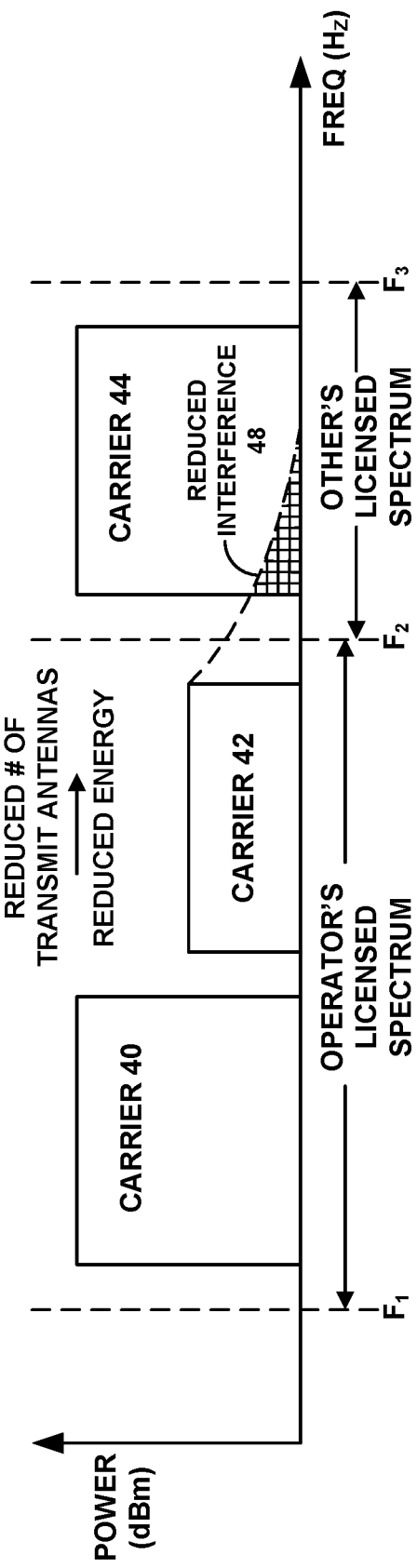

METHOD AND SYSTEM FOR CONTROLLING INTERFERENCE BY DYNAMICALLY ADJUSTING QUANTITY OF ANTENNAS

REFERENCE TO RELATED APPLICATION

This is a continuation of U.S. patent application Ser. No. 16/535,581, filed Aug. 8, 2019, the entirety of which is hereby incorporated by reference.

BACKGROUND

A typical cellular wireless system includes a number of base stations configured to provide wireless coverage areas in which to serve wireless client devices (WCDs) such as cell phones, tablet computers, tracking devices, embedded wireless modules, and other wirelessly equipped devices. In turn, each base station could sit as a node on a core access network that includes entities such as a network controller and a gateway system providing connectivity with one or more external transport networks such as the Public Switched Telephone Network (PSTN) and/or the Internet. With this arrangement, a WCD within coverage of the system could engage in air interface communication with a base station and could thereby communicate via the base station with various remote network entities or with other WCDs served by the base station.

Such a system could operate in accordance with a particular radio access technology, with air-interface communications from the base stations to WCDs defining a downlink or forward link and air-interface communications from the WCDs to the base stations defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the radio access technology, each base station could provide service on one or more carriers, each of which spanning one or more radio-frequency (RF) channels for carrying communications wirelessly between the base station and WCDs. In particular each carrier could be frequency division duplex (FDD), defining separate frequency channels for downlink and uplink use, or time division duplex (TDD), defining a single frequency channel multiplexed over time between downlink and uplink use.

Each such frequency channel could be characterized by its position and width in RF spectrum, such as by a designated center frequency and bandwidth. Further, each channel could be structured to define various physical resources for carrying communications. For instance, under an example radio access technology, each channel could be divided over time into frames, subframes, and timeslots, and symbol segments, and could be divided over frequency into subcarriers. As a result, each channel could define an array of time-frequency resource elements in which subcarriers can be modulated to carry data communications. Further, within each subframe and timeslot, these resource elements could be divided into groups defining physical resource blocks (PRBs) that can be allocated to carry data on an as-needed basis.

Overview

In practice, the operator of a cellular wireless system may acquire a license for use of specific frequency ranges by the system and may configure its base stations to provide service on carriers defined in those frequency ranges. In the United States, for instance, the Federal Communication Commission is responsible for managing and licensing electromagnetic spectrum for commercial and non-commercial uses. Thus, the operator of a cellular wireless system may acquire a spectrum license from the FCC and may configure its base stations to operate on the licensed spectrum.

While such a license may allow for liberal use of the licensed spectrum to provide cellular wireless service, certain restrictions apply. One restriction of note is the need to avoid or minimize harmful interference to adjacent frequency that is licensed for use by others.

This is especially an issue where the adjacent frequency is licensed for use by public safety radio systems. In that scenario, there is at least a risk that downlink transmissions from the cellular operator's base stations could interfere with reception of important public safety communications by nearby first-responder radio units, due to imperfect filter roll-off, out-of-band emissions, or the like. Further, similar interference issues could exist where the adjacent frequency is licensed for use by another cellular operator, even if not for public-safety communications.

One recent trend that may contribute to this interference issue is the growing use of MIMO technology. MIMO technology can enable a base station to engage in air interface communication concurrently on multiple different RF propagation paths, or MIMO "layers," with multiple layers possibly occupying the same air interface resources (e.g., PRBs) as each other. To facilitate this, the base station could be equipped with a MIMO antenna array, comprising multiple transmit antennas and multiple receive antennas. By suitably weighting and precoding transmissions by particular antennas in the array, the base station can then output separate but concurrent transmissions for receipt by its served WCDs.

MIMO could be used in a "single-user MIMO" (SU-MIMO) configuration to increase the data rate of transmission to a single WCD, by multiplexing communications to the WCD onto multiple separate layers using the same air interface resources as each other. Further, MIMO could also be used in a "multi-user MIMO" (MU-MIMO) configuration to increase the data capacity of the air interface by transmitting to multiple WCDs on respective, separate layers using the same air interface resources as each other.

In dense urban markets and other areas, cellular wireless operators may face a need to provide an increased extent of MIMO service. In particular, in such areas, an operator may serve a great many WCDs or may otherwise need to support high aggregate throughput, but the operator may have limited licensed spectrum (e.g., defining a limited number of PRBs per timeslot). To help overcome that limitation, the operator may equip its base stations with massive-MIMO antenna arrays.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. The base station could then be configured to provide MIMO service, with many such antennas transmitting concurrently.

Unfortunately, however, having many antennas transmit concurrently on a given carrier (e.g., with a massive-MIMO array) could increase the total energy output on that carrier, which could in turn result in increased interference to adjacent frequency that is licensed for use by others. Therefore, an improvement is desired.

Disclosed herein is an improved method and system. In accordance with the disclosure, where a cellular base station is licensed to operate on a given carrier occupying particular RF frequency, the base station or associated equipment will detect a trigger for reducing potential interference to adjacent frequency, and the base station will responsively reduce the number of antennas that the base station has enabled for transmission on the particular carrier.

In an example implementation where the base station has N transmit antennas, the base station may be configured with all N of those antennas enabled for transmission on the carrier. For instance, the base station could implement for the N antennas one or more RF filters with a passband encompassing the frequency range of the carrier, and the base station could be set to treat all N of the antennas as available for use to transmit on the carrier. In response to the trigger for reducing potential interference to an adjacent frequency, the base station could then reconfigure itself to prevent a proper subset (some, but less than all) of the N antennas from being used for transmission on the carrier. For instance, for the base station could dynamically change the passband of the one or more RF filters for the proper subset of antennas to exclude the frequency range of the carrier, and/or the base station could reset itself to treat the proper subset of antennas as not being available for use to transmit on the carrier.

By reducing the number of antennas that the base station has enabled for transmission on the carrier, the base station could thereby reduce the overall energy of its transmission on the carrier. This may be the case especially when the base station is heavily loaded and/or would otherwise have reason to use many transmit antennas at once in order to achieve high MIMO gain. By reducing the number of antennas that the base station has enabled for transmission on the carrier, the base station in that scenario may use fewer antennas in total for its transmission on the carrier. And as a result, the overall energy of the base station's transmission on the carrier may be lower, and the associated energy level of interference on the adjacent frequency may therefore be lower.

Further, by keeping some of its antennas enabled for transmission on the carrier, the base station could optimally still serve WCDs on the carrier, albeit with use of a reduced number of transmit antennas.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 5 is an illustration of spurious emission as interference on an adjacent frequency.

FIG. 6 is an illustration of reduced-energy interference resulting from transmission with a reduced number of antennas.

DETAILED DESCRIPTION

Figure 1:
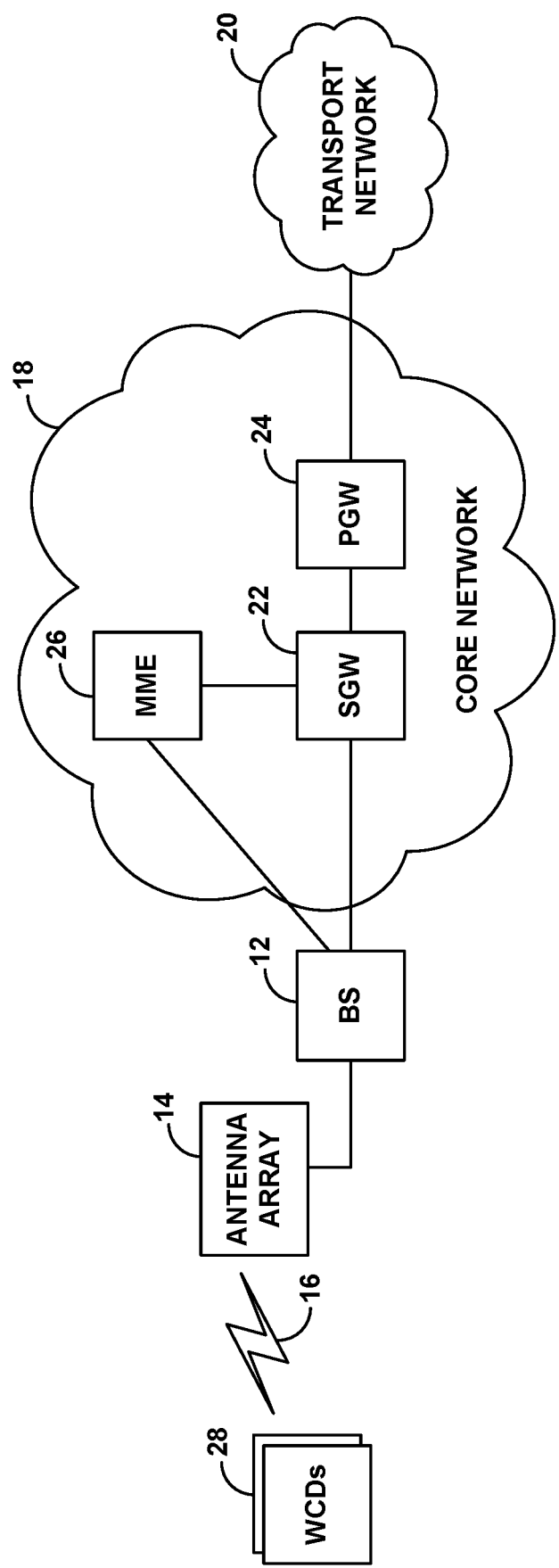
FIG. 1 is a simplified block diagram of a wireless communication system in which various disclosed features can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12, having an antenna array 14 through which to provide coverage 16 in which to serve WCDs. This base station could be a macro base station of the type configured to provide a wide range of coverage, with its antenna array mounted on a tower or other tall structure. Alternatively, the base station could take other forms, such as a small cell base station, a repeater, a femtocell base station, or the like, possibly configured to provide a smaller range of coverage.

Base station 12 could be configured to operate according to 4G LTE, 5G NR, or another radio access technology now known or later developed. As such, the operator of base station 12 could be licensed to operate on a range of RF spectrum, and base station 12 could be configured to operate on one or more carriers in that licensed spectrum.

As noted above, each such carrier could be FDD or TDD, defining one or more frequency channels each having a designated center frequency and bandwidth. And each channel could be divided over time and frequency into resource elements. These resource elements could then be grouped into PRBs as described above. Further, certain resource elements per subframe could be reserved for other purposes, such as to carry a reference signal, synchronization signals, scheduling directives, acknowledgement messages, and other signaling. Other air-interface configurations are possible as well.

Base station 12 is further shown coupled with an example core network 18. Core network 18 could be an enhanced packet core (EPC) network, a next generation core (NGC) network, or another network including components supporting an applicable radio access technology and possibly providing connectivity with at least one transport network 20, such as the Internet.

In an example implementation as shown, the core network 18 includes a serving gateway (SGW) 22, a packet data network gateway (PGW) 24, and a mobility management entity (MME) 26. As shown, the base station 12 could then have communication interfaces with the SGW 22 and the MME 26, the SGW 22 could have a communication interface with the PGW 24, and the PGW 24 could provide connectivity with the transport network 20.

FIG. 1 also illustrates multiple WCDs 28 that may be served at once by base station 12.

When each such WCD enters into coverage of the base station, the WCD could detect and evaluate coverage of the base station on a particular carrier (e.g., by detecting synchronization signals broadcast on the carrier and measuring strength of a reference signal broadcast on the carrier). The WCD could then engage in random access signaling and Radio Resource Control (RRC) signaling with the base station on that carrier, to establish an RRC connection through which the base station could serve the WCD. And if appropriate, the WCD could then engage in attach signaling with the MME, via the RRC connection and the base station, to register for service with the network.

Once the WCD is so connected and registered, the base station could then serve the WCD with data communications. For instance, when the PGW receives packet-data from network 20 for transmission to the WCD, that data could flow via the SGW to the base station, and the base station could allocate particular downlink PRBs to carry the data to the WCD and could transmit the data to the WCD on those PRBs. And when the WCD has packet-data to transmit, the WCD could transmit a scheduling request to the base station, the base station could responsively allocate particular uplink PRBs to carry the data from the WCD, the WCD could transmit the data to the base station on those PRBs, and the base station could forward that data via the SGW to the PGW.

As numerous WCDs 28 might be connected with the base station concurrently on the base station's carrier(s), the base station could apply a scheduling algorithm to fairly and appropriately allocate the base station's limited number PRBs per carrier for use to carry communication to and from those WCDs. On a per subframe basis, for instance, the base station may work to distribute the available downlink PRBs of a carrier among various served WCDs, to carry communications to those WCDs.

Further, especially in heavy load situations where all of the carrier's downlink PRBs per subframe might be allocated, the base station may apply MIMO on each carrier, using its antenna array to provide multiple layers of concurrent transmission on scheduled PRBs of the carrier as discussed above.

Figure 2:
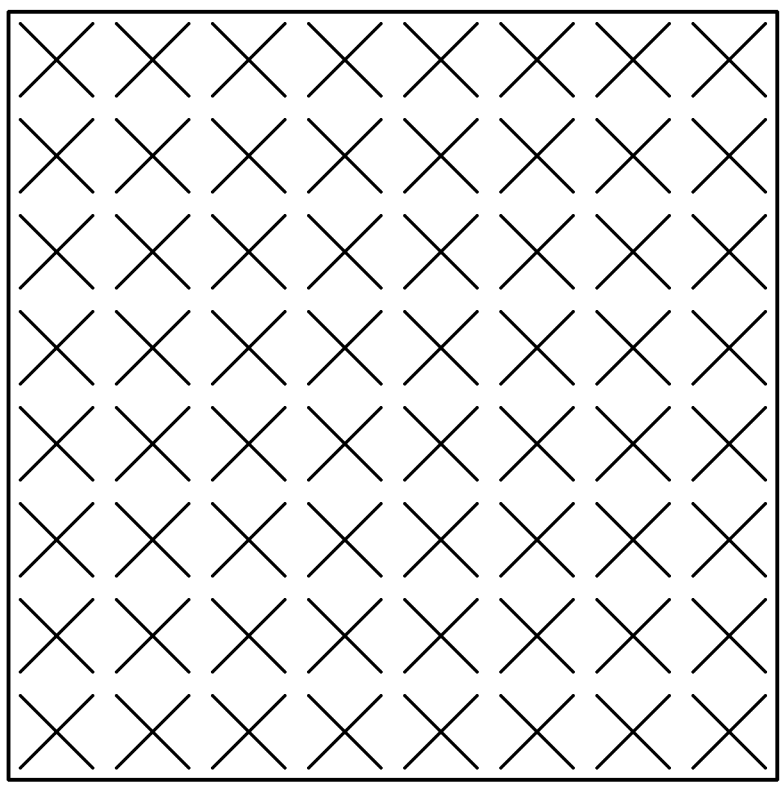
FIG. 2 is a simplified diagram of an example massive-MIMO antenna array that could be implemented according to the disclosure.

FIG. 2 is a simplified diagram of a massive-MIMO array that could be implemented as array 14 at base station 12 in an example implementation. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In an example implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

With this example massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs), perhaps with up to 16 WCDs grouped for MU-MIMO service, or serving a single WCD with up to 16 layers of SU-MIMO service, among other possibilities.

In practice, base station 12 could further be configured with one or more RF passband filters designed to limit the base station's RF transmission to be within the operator's licensed frequency range and perhaps specifically within the frequency range of the base station's one or more operating carriers. With a massive-MIMO array as shown in FIG. 2, for instance, the base station could be equipped with one or more such RF filters respectively per antenna and/or for each of various groups of antennas (e.g., per column or other bank of transmit antennas). In particular, for each antenna or group of antennas, the base station could be equipped with an RF transmit chain that includes one or more such RF filters.

Figure 3:
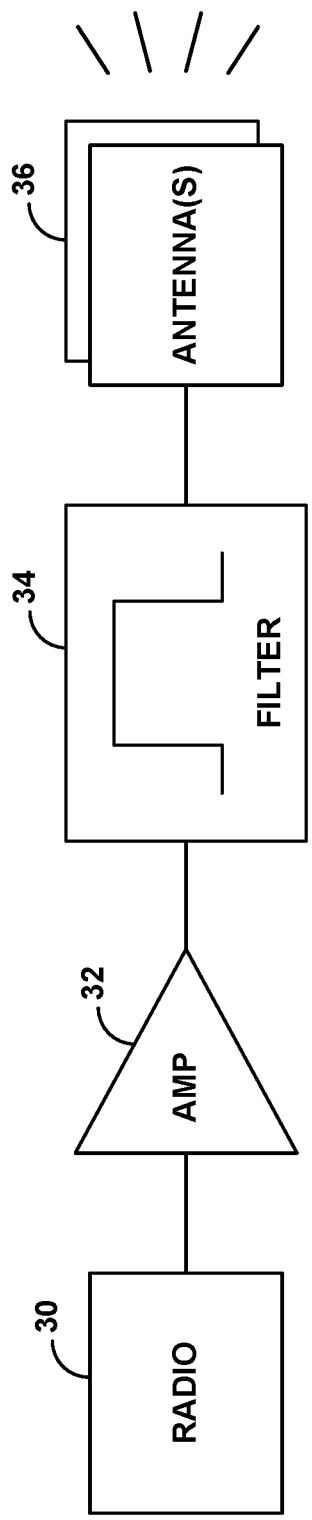
FIG. 3 is a simplified circuit diagram depicting an example RF transmit chain for one or more antennas.

In FIG. 3 is a simplified circuit diagram depicting components of an example of such an RF transmit chain. As shown in FIG. 3, the example RF transmit chain includes a radio 30, an RF amplifier 32, an RF filter 34, and one or more antennas 36.

Radio 30 could be situated in a baseband unit of the base station and could operate to modulate data onto one or more RF carriers for transmission. The modulated RF carrier signals could then pass to RF amplifier 32, which could operate to amplify the signals and output amplified RF signals. And the amplified RF signals could then pass to RF filter 34, which could operate to filter the signals in an effort to limit the transmission to an operating frequency range of the base station. The amplified and filtered RF signals could then pass to the one or more antennas 36, which could operate to transmit the signals over the air for receipt by one or more WCDs.

In an ideal implementation, RF filter 34 would pass signals only in the base station's operating frequency range. In reality, however, the filter will likely be imperfect, passing harmonics and/or other signals outside of that range. Further, to the extent the base station processes transmissions on multiple subcarriers and/or multiple carriers, those transmissions might combine with each other to produce intermodulation products or the like that might also fall outside of the base station's operating frequency range. For these or other reasons, the base station's antennas may provide at least some spurious emission—i.e., air-interface transmission extending outside of the base station's intended, operating frequency range.

Figure 4:
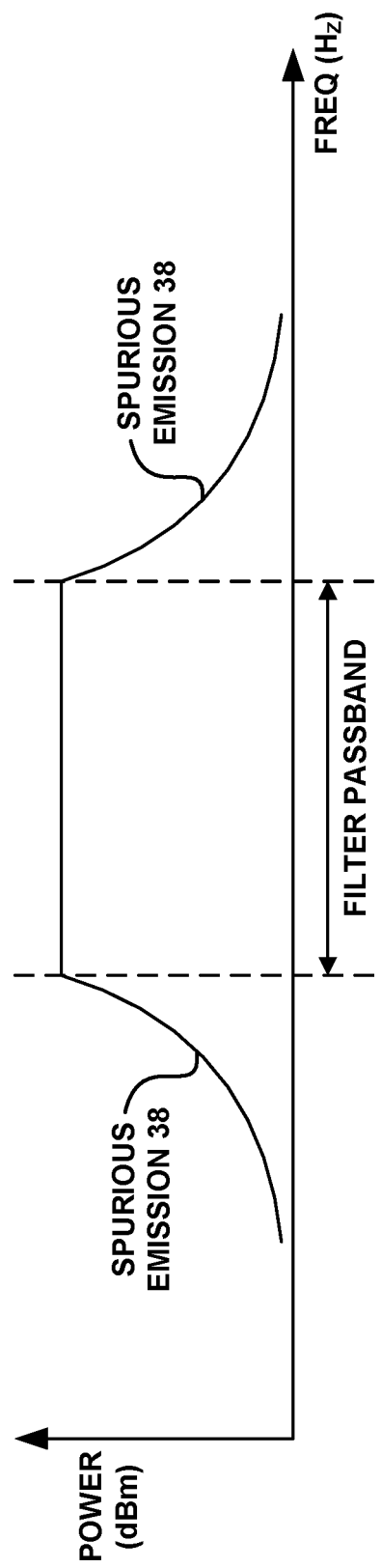
FIG. 4 is an illustration of spurious emission outside of an intended frequency range.

FIG. 4 illustrates this spurious emission by way of example, as a decaying signal 38 extending outward in frequency from each end of a representative RF-filter passband.

Unfortunately, as discussed above, this or other spurious emission from the base station could interfere with service provided on an adjacent frequency. Here, "adjacent" frequency could be any frequency that is near enough in RF spectrum that it may overlap in frequency with the spurious emission from the base station. To be adjacent, the other frequency need not share a frequency boundary with the base station's operating frequency range. For instance, there could be a guard band between the two and/or one or more other carriers or other ranges of frequency between the two.

FIG. 5 illustrates this interference problem by way of example.

In particular, FIG. 5 illustrates a scenario where base station 12 is configured to operate on two example carriers 40, 42, and where another operator (e.g., a public safety provider and/or competitor cellular provider) provides nearby service on an adjacent carrier 44. As shown, for instance, an operator of base station 12 might have licensed spectrum from frequency $F_1$ to frequency $F_2$ and might configure base station 12 to operate on carriers 40, 42 defined in that spectrum, and the other operator might have licensed spectrum from frequency $F_2$ to frequency $F_3$ and might configure a nearby base station (not shown) to operate on carrier 44 defined in that spectrum.

In this example scenario, base station 12 may be configured with one or more RF filters designed to limit transmission to the frequency range $F_1$ to $F_2$ or specifically to the frequency ranges of carriers 40, 42. However, as noted above, base station 12 will likely provide at least some spurious emission. And as shown, this spurious emission could extend into the frequency range of adjacent carrier 44, as interference 46, which could impact nearby downlink and/or uplink communication on adjacent carrier 44.

In line with the discussion above, the present disclosure could provide for detecting a trigger to reduce the potential for this interference on adjacent carrier 44 and for responding to the trigger by dynamically reducing the number of transmit antennas that base station 12 has enabled for transmission on at least carrier 42. Reducing the number of antennas that the base station has enabled for transmission on carrier 42 may help to reduce the overall energy of the base station's transmission on carrier 42, which may correspondingly help to reduce the level of associated spurious emission and interference 46 on adjacent carrier 44.

In a representative implementation, base station 12 and/or an associated entity could operate in various ways to detect the trigger for reducing a potential for interference on adjacent carrier 44.

By way of example, detecting the trigger could involve detecting the presence of communication on carrier 44, as interference on carrier 44 may pose an issue specifically when there is communication on carrier 44. To facilitate this, the base station could include and/or be interconnected with an RF sniffer (not shown) that is configured to measure the level of energy specifically on carrier 44, possibly representing downlink and/or uplink communication on carrier 44. The RF sniffer could thereby detect the trigger by detecting when the energy level on carrier 44 is at least as high as a predefined threshold energy level that is deemed to represent likely active communication on that carrier, and the RF sniffer could responsively provide a control signal that causes the base station to reduce the number of antennas that the base station has enabled for transmission on carrier 42. Alternatively, the RF sniffer could regularly report the level of energy measured on carrier 44, and base station 16 could detect the trigger by detecting when that energy level is at least as high as the predefined threshold energy level.

As another example, detecting the trigger could involve receiving directly or indirectly from an operator of the nearby base station an indication that there is at least a threshold level of energy on carrier 44, which could represent active communication on carrier 44 and/or interference on carrier 44. To facilitate this, the operators of base station 12 and the nearby base station might share an element management system (EMS) (not shown). The nearby base station could then report to the EMS when active communication is underway on carrier 44 and/or when there is threshold high energy representing interference on carrier 44, and the EMS could responsively report that information to base station 12. Alternatively, the base stations could exchange this information more directly with each other. Base station 12 could thus detect the trigger by learning in this manner or the like when there is active communication on carrier 44 and/or when there is predefined threshold high interference on carrier 44. Other examples could be possible as well.

In response to detecting the trigger for reducing the potential for interference on adjacent carrier 44, base station 12 could then reduce the number of antennas that it has enabled for transmission on carrier 42.

To facilitate this, the base station could first select a proper subset of its transmit antennas to be disabled from use for transmission on carrier 42. In the example arrangement of FIG. 2, for example, the base station could select one or more columns of transmit antennas to be so disabled, and/or the base station could select one or more individual ones of the antennas to be so disabled. The base station could then disable each antenna of the selected proper subset from use for transmission on carrier 42, while leaving each other of the base station's transmit antennas enabled for transmission on carrier 42 so as to still be able to transmit on carrier 42.

For each of one or more antennas that the base station will disable from use for transmission on carrier 42, the base station could so disable the antenna in various ways. As noted above, for instance, the base station could dynamically adjust one or more RF filters so as to exclude carrier 42 from the passband feeding each such antenna. With the arrangement of FIG. 3, for instance, the base station could change RF filter 34 from having a passband that encompasses both carriers 40 and 42 to having a passband that encompasses carrier 40 but not carrier 42. Further or alternatively, the base station could set itself to not treat each such antenna as available for use with transmission on carrier 42, so that the base station will not configure transmission on carrier 42 to occur on each such antenna. Other examples may be possible as well.

In practice, the extent of antenna reduction implemented by the base station could be a matter of engineering design choice depending on various factors. As a non-limiting example, for instance, the base station could reduce by half the number of antennas that the base station has enabled for transmission on carrier 42. Thus, with the arrangement of FIG. 2, the base station may transition from having 64 antennas enabled for transmission on carrier 42 to having just 32 antennas enabled for transmission on carrier 42. Other extents of reduction are also possible.

Once the base station has reduced the number of its transmit antennas that it has enabled for transmission on carrier 42, the base station could then continue to provide service on carrier 42, albeit with fewer antennas. Thus, again especially in a heavy load situation or otherwise when the base station has reason to transmit on carrier 42 on many antennas at once, the base station would be limited to such transmission occurring on the reduced number of transmit antennas.

As noted above, transmitting on carrier 42 with the reduced number of antennas may result in overall reduced energy of the base station's transmission on carrier 42 and thus reduced associated interference on adjacent carrier 44. FIG. 6 illustrates this by way of example, by comparison with the arrangement of FIG. 5. Namely, FIG. 6 illustrates that by reducing in half the number of antennas that the base station has enabled for transmission on carrier 42, the overall energy of the base station's transmission on carrier 42 might be cut in half, which may in turn result in substantially reduced interference 48 on carrier 44.

In the example so far discussed, the base station reduces the number of its antennas enabled for transmission on carrier 42, as that is the carrier closed in frequency to the adjacent carrier 44. In a further implementation, the base station might also or alternatively respond to the trigger by reducing the number of its antennas enabled for transmission on a more distant carrier such as carrier 40.

In addition, while the discussion above focuses on reducing the number of antennas enabled for transmission on a particular carrier, similar principles could apply to reduce the number of antennas enabled for transmission on specific PRBs or other frequency resources of a carrier. For instance, the base station could respond to the trigger by transitioning to avoid use of a proper subset of its antennas for use to transmit on some number of PRBs closed in frequency to the adjacent carrier 44, while continuing to use those antennas for transmission on other PRBs.

Figure 7:
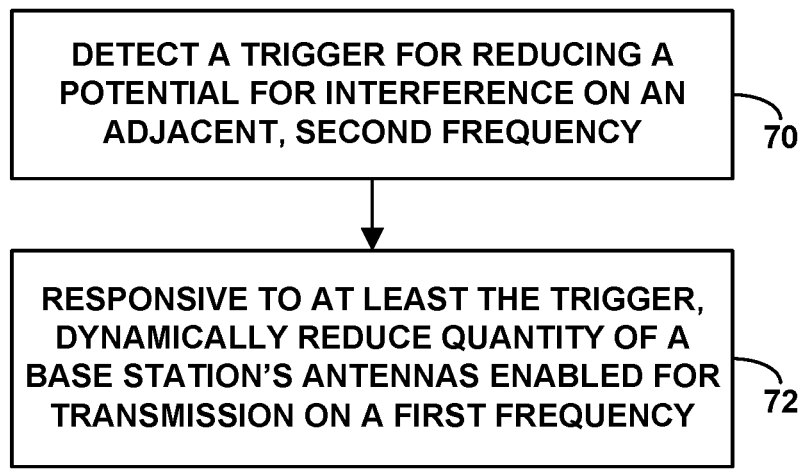
FIG. 7 is a flow chart depicting example operations in accordance with the disclosure.

FIG. 7 is next a flow chart depicting a method that could be carried out in accordance with the present disclosure, to help control interference by dynamically adjusting a quantity of antennas. This method could be implemented by or for a base station that is configured to operate on a first frequency and is equipped with a number of antennas enabled for transmission on the first frequency. As discussed above, for instance, such as base station could be equipped with a massive-MIMO antenna array, an at issue could be transmission by the base station using the antennas of that array.

As shown in FIG. 7, at block 70, the method includes detecting a trigger for reducing a potential for interference on an adjacent, second frequency. And at block 72, the method includes, responsive to at least the trigger, dynamically reducing the number of the base station's antennas enabled for transmission on the first frequency.

As discussed above, the act of dynamically reducing the number of the base station's antennas enabled for transmission on the first frequency could involve disabling a proper subset of the base station's antennas from use for transmission on the first frequency, while keeping a remainder of the base station's antennas enabled for transmission on the first frequency. For instance, this could include adjusting one or more a RF filters to exclude the first frequency from a passband for each antenna of the proper subset and/or setting the base station to not provide transmission on the first frequency by each antenna of the proper subset.

Further, as discussed above, detecting the trigger for reducing the potential for interference on the adjacent frequency could involve monitoring energy on the adjacent frequency and detecting as the trigger a presence of at least predefined threshold high energy level on the adjacent frequency. For instance, this could be done at least in part by the base station, by an RF sniffer, and/or by another base station that is configured to provide service on the adjacent frequency.

In addition, as discussed above, the method could additionally involve determining that the base station is at least predefined threshold heavily loaded (e.g., currently serving at least a predefined threshold high number of WCDs and/or having at least a predefined threshold high PRB allocation rate or other utilization). And in that case, the act of dynamically reducing of the number of the base station's antennas enabled for transmission on the first frequency could be responsive to a combination of at least the trigger for reducing the potential for interference on the adjacent frequency and (ii) the determining that the base station is at least predefined threshold heavily loaded.

Still further, as discussed above, the first frequency could be a carrier on which the base station is configured to operate or could be some portion of such a carrier, such as particular PRBs for instance. And the adjacent frequency (also possibly a carrier) could be a public-safety frequency, among other possibilities.

And yet further, the base station at issue could additionally configured to operate on a third frequency, and the number of the base station's antennas could also be enabled for transmission on the third frequency. And in that case, the method could additionally include, responsive to at least the trigger, dynamically reducing the number of the base station's antennas enabled for transmission on the third frequency.

Figure 8:
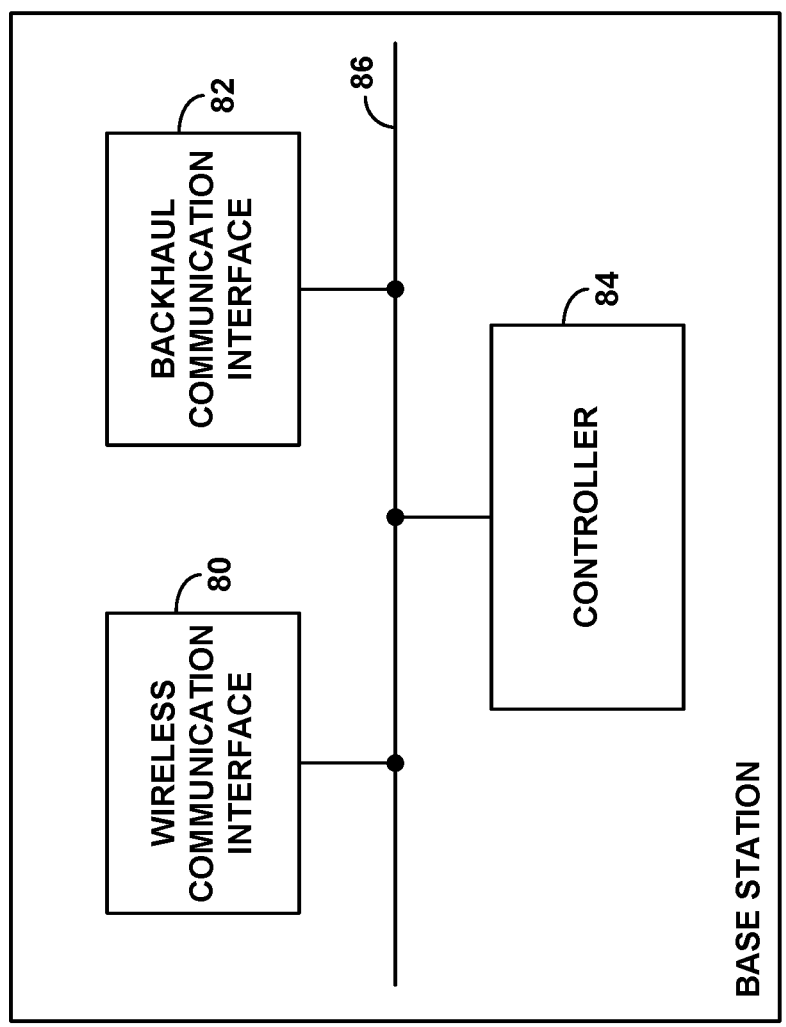
FIG. 8 is a simplified block diagram of a base station operable in accordance with the disclosure.

Finally, FIG. 8 is a simplified block diagram of a base station, such as base station 12 showing some of the components that could be included in the base station in a non-limiting example implementation. As shown, the example base station includes a wireless communication interface 80, a backhaul communication interface 82, and a controller 84, could be integrated together in various ways (e.g., on a chipset) and/or interconnected by a system bus, network, or other communication mechanism 86 as shown.

The wireless communication interface 80 could include a transceiver configured to serve WCDs in accordance with one or more radio access technologies and could comprise one or more radios, amplifiers, and RF filters as well as an antenna structure such as the massive-MIMO array discussed above, including multiple transmit antennas enabled for transmission on a first frequency. The backhaul wireless communication interface 82 could then comprise a wired or wireless network communication module, such as an Ethernet interface, through which to communicate with other entities.

Further, the controller 84 could comprise a processing unit (e.g., one or more processors), non-transitory data storage (e.g., one or more volatile and/or non-volatile storage components, such as magnetic, optical, or flash storage), and program instructions stored in the data storage and executable by the processing unit to carry out, or cause the base station to carry out, various operations. For instance, the operations could include (i) detecting a trigger for reducing a potential for interference on an adjacent, second frequency and (ii) responsive to at least the trigger, dynamically reducing how many of the transmit antennas are enabled for transmission on the first frequency.

Various features discussed above can be implemented in this context, and vice versa.

Further, the present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

We claim:

1. A method for controlling transmission by a base station, wherein the base station is configured to operate on a first frequency and is equipped with a number of antennas enabled for transmission on the first frequency, the method comprising:
   detecting a trigger for reducing a potential for interference on an adjacent, second frequency; and
   responsive to at least the trigger, dynamically reducing the number of the base station's antennas enabled for transmission on the first frequency,
   wherein dynamically reducing the number of the base station's antennas enabled for transmission on the first frequency comprises disabling a proper subset of the base station's antennas from use for transmission on the first frequency, while keeping a remainder of the base station's antennas enabled for transmission on the first frequency.

2. The method of claim 1, wherein disabling the proper subset of the base station's antennas from use for transmission on the first frequency comprises setting the base station to not provide transmission on the first frequency by each antenna of the proper subset.

3. The method of claim 1, wherein detecting the trigger for reducing the potential for interference on the adjacent frequency comprises monitoring energy on the adjacent frequency and detecting as the trigger a presence of at least predefined threshold high energy level on the adjacent frequency.

4. The method of claim 3, wherein monitoring the energy on the adjacent frequency is carried out by the base station.

5. The method of claim 3, wherein monitoring the energy on the adjacent frequency is carried out by a radio-frequency (RF) sniffer.

6. The method of claim 3, wherein monitoring the energy on the adjacent frequency is carried out by a base station configured to provide service on the adjacent frequency.

7. The method of claim 1, further comprising determining that the base station is at least predefined threshold heavily loaded, wherein the dynamically reducing of the number of the base station's antennas enabled for transmission on the first frequency is responsive to a combination of at least the trigger and the determining.

8. The method of claim 1, wherein the first frequency is a carrier on which the base station is configured to operate.

9. The method of claim 1, wherein the adjacent frequency is a public-safety frequency.

10. The method of claim 1, wherein transmission on the antennas comprises multiple-input-multiple-output (MIMO) transmission.

11. The method of claim 10, wherein the base station is equipped with a massive-MIMO antenna array including the number of antennas.

12. The method of claim 1, wherein the base station is additionally configured to operate on a third frequency and the number of the base station's antennas are enabled for transmission on the third frequency as well, the method further comprising:
   responsive to at least the trigger, dynamically reducing the number of the base station's antennas enabled for transmission on the third frequency.

13. A base station comprising:
   an antenna structure including a plurality of transmit antennas, wherein each of the transmit antennas is enabled for transmission on a first frequency; and
   a controller for controlling transmission by the base station, wherein the controller is configured (i) to detect a trigger for reducing a potential for interference on an adjacent, second frequency and (ii) responsive to at least the trigger, to dynamically reduce how many of the transmit antennas are enabled for transmission on the first frequency,
   wherein dynamically reducing how many of the base transmit antennas are enabled for transmission on the first frequency comprises disabling a proper subset of the transmit antennas from use for transmission on the first frequency, while keeping a remainder of the transmit antennas enabled for transmission on the first frequency.

14. The base station of claim 13, wherein the controller comprises a processing unit, non-transitory data storage, and program instructions stored in the non-transitory data storage and executable by the processing unit to carry out the detecting and reducing.

15. The base station of claim 13, wherein the first frequency is a carrier on which the base station is configured to operate.

16. The base station of claim 13, wherein the adjacent frequency is a public-safety frequency.

17. A non-transitory computer-readable medium having encoded thereon instructions executable to carry out operations for controlling transmission by a base station, wherein the base station is configured to operate on a first frequency and is equipped with a number of antennas enabled for transmission on the first frequency, the operations including:
   detecting a trigger for reducing a potential for interference on an adjacent, second frequency; and
   responsive to at least the trigger, dynamically reducing the number of the base station's antennas enabled for transmission on the first frequency,
   wherein dynamically reducing the number of the base station's antennas enabled for transmission on the first frequency comprises disabling a proper subset of the base station's antennas from use for transmission on the first frequency, while keeping a remainder of the base station's antennas enabled for transmission on the first frequency.

18. The non-transitory computer-readable medium of claim 17, wherein disabling the proper subset of the base station's antennas from use for transmission on the first frequency comprises setting the base station to not provide transmission on the first frequency by each antenna of the proper subset.

19. The non-transitory computer-readable medium of claim 17, wherein detecting the trigger for reducing the potential for interference on the adjacent frequency comprises monitoring energy on the adjacent frequency and detecting as the trigger a presence of at least predefined threshold high energy level on the adjacent frequency.

20. The non-transitory computer-readable medium of claim 17, wherein the adjacent frequency is a public-safety frequency.

* * * * *